United States Patent [19]
Cizmer et al.

[11] Patent Number: 5,362,454
[45] Date of Patent: Nov. 8, 1994

[54] HIGH TEMPERATURE HEAT EXCHANGER

[75] Inventors: Lloyd E. Cizmer, Missouri City; Jing M. Lee, Stafford; Thomas M. O'Connor, Houston, all of Tex.

[73] Assignee: The M. W. Kellogg Company, Houston, Tex.

[21] Appl. No.: 84,657

[22] Filed: Jun. 28, 1993

[51] Int. Cl.[5] .................. F28D 7/00; B01J 19/00; F28F 9/02
[52] U.S. Cl. .................. 422/201; 422/203; 422/205; 422/241; 165/158
[58] Field of Search ............ 422/201, 203, 205, 239, 422/241; 165/158

[56] References Cited

U.S. PATENT DOCUMENTS

| | | | |
|---|---|---|---|
| 4,221,763 | 9/1980 | Greene | 422/197 |
| 4,519,445 | 5/1985 | Norris | 165/158 |
| 4,585,057 | 4/1986 | Marburger | 165/158 |
| 4,630,673 | 12/1986 | Belleli | 165/158 |
| 4,690,690 | 9/1987 | Andrew et al. | 48/214 |
| 4,731,098 | 3/1988 | Marsch | 48/95 |
| 5,000,926 | 3/1991 | Murayama et al. | 422/197 |
| 5,004,592 | 4/1991 | Pinto | 423/652 |
| 5,063,028 | 11/1991 | Humble et al. | 422/144 |
| 5,068,058 | 11/1991 | Bushinsky et al. | 252/376 |
| 5,112,578 | 5/1992 | Murayama et al. | 422/197 |

Primary Examiner—Robert J. Warden
Assistant Examiner—Christopher Y. Kim
Attorney, Agent, or Firm—John P. Ward

[57] ABSTRACT

A high temperature heat exchanger having an improved support apparatus for suspending a tube bundle. The improved support comprises a skirt from which the tube sheet and the bundle are supported, and a lip on an upper end of the skirt engaged in a flange assembly receiving the lip. A first refractory lining on an inside face of the skirt extends downwardly from the lip, and overlaps a second refractory lining on an outside surface of the skirt extending upwardly from adjacent the tube sheet toward the lip. By securing the support apparatus in the cold flange assembly, the interior refractory is not used for supporting the tube bundle and can maintain its integrity, have a lower incidence of premature failure and yield an optimum refractory life.

20 Claims, 4 Drawing Sheets

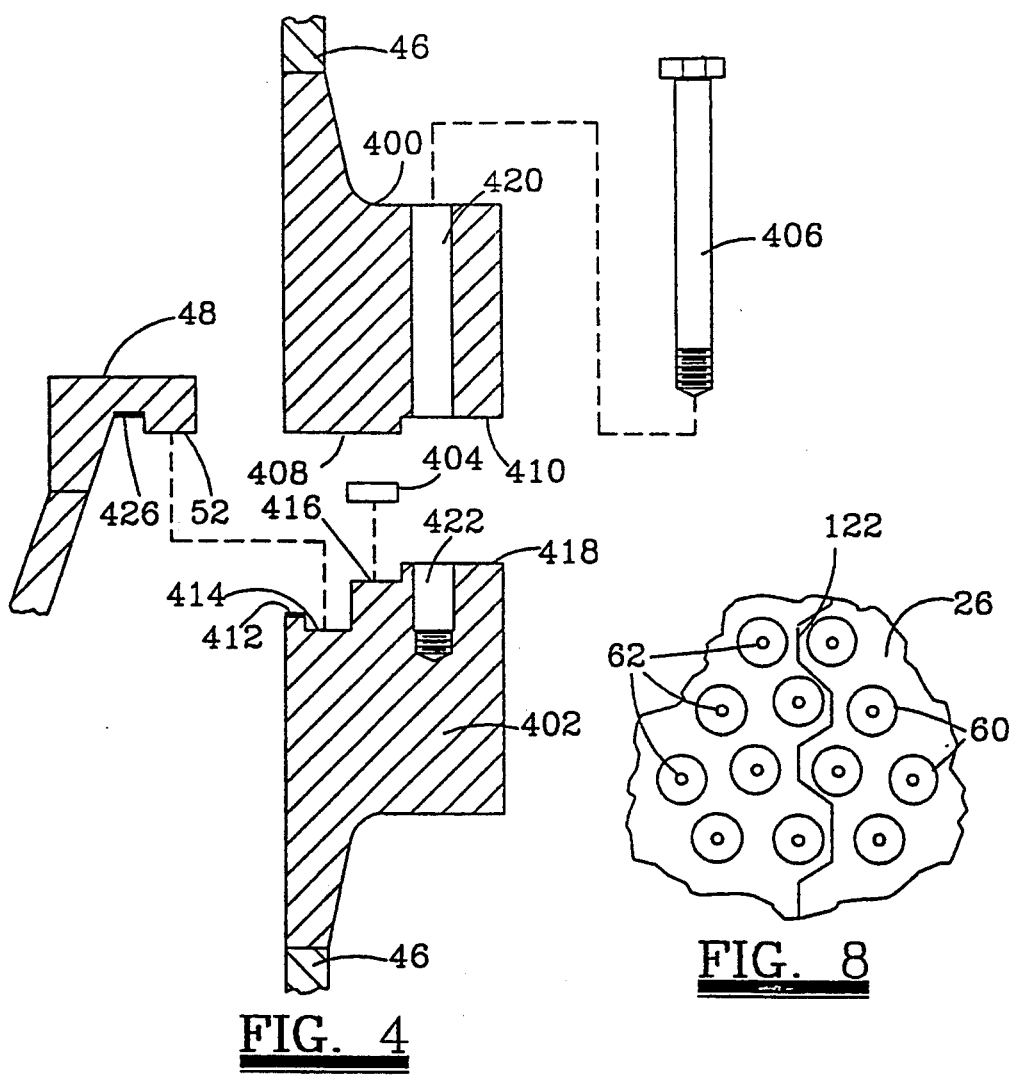
FIG. 4
FIG. 8
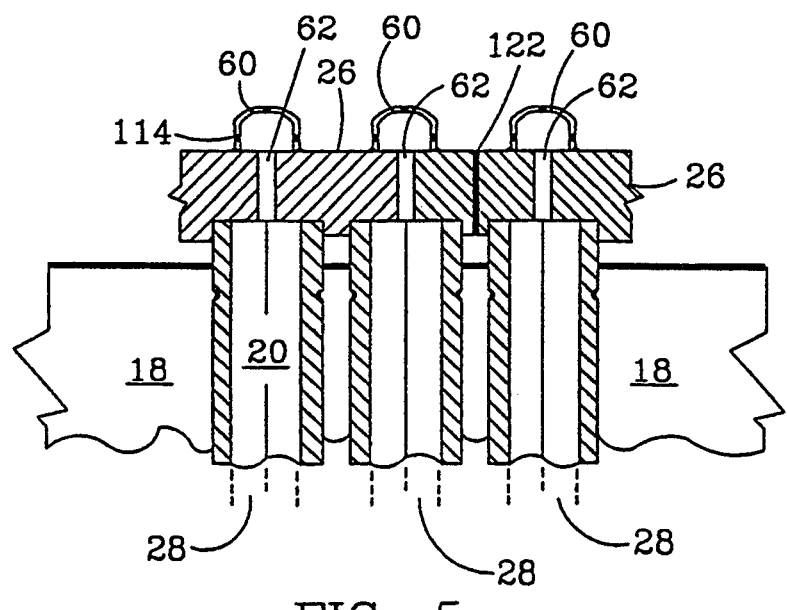
FIG. 5

HIGH TEMPERATURE HEAT EXCHANGER

FIELD OF THE INVENTION

The present invention relates generally to an improved support structure for use in high temperature heat exchangers. More specifically, the present invention is an improved support apparatus for supporting catalyst filled tubes from a flange assembly of a hydrocarbon reforming heat exchanger.

BACKGROUND OF THE INVENTION

The prior art tube bundles of high temperature heat exchangers have typically been secured to interior refractory material, adding stress to the refractory material, causing premature refractory failure and expensive repair of the refractory material and tube bundle. Designing support structures for tube bundles in high temperature heat exchangers, including reforming reactors, has been and continues to be a major problem. Support structures for use inside high temperature vessels must withstand excessively high temperatures and weight stresses while supporting a variety of components including baffles, catalyst tubes, diffusion plates and other components in extremely harsh environments.

The prior art support structures in reforming exchangers include attachment directly into the refractory material which lines the interior surface of catalytic reactors. The refractory material covers and protects the interior surface of the catalytic reactor from the high temperatures generated within the reactor and prevents "hot spots," i.e., excessive amounts of heat from reaching and possibly causing failure of the reactor walls. The refractory material can be of varying thicknesses and components, but is typically a ceramic or cement-like material which is heat resistant. Refractory material is brittle and does not adequately support interior components which may expand or contract due to the wide temperature variations.

Refractory material thus has a limited life expectancy under optimum conditions. Given the additional stresses of supporting internal components, the refractory material tends to break loose at an accelerated rate, increasing the frequency of costly repair and interrupting the operation of the exchanger. Moreover, the internal support structures supported by refractory in prior art reactors are typically constructed of various metallic alloys. When the temperatures change from cool to hot to cool again, these support structures can damage refractory during the thermal expansion and contraction cycles.

Therefore, a need exists for a tube bundle support system designed to withstand the harsh environment of the high temperature exchanger to reduce the expense and time involved in repairing and maintaining exchangers of this nature.

SUMMARY OF THE INVENTION

The present invention provides a high temperature heat exchanger having an improved support apparatus for supporting tubes used in heat transfer between shell-side and tube-side fluids. The heat exchanger includes a refractory-lined vessel having upper and lower ends and containing a tube bundle supported in the vessel between the upper and lower ends. The tube bundle includes a plurality of tubes supported by an upper tube sheet. A tube sheet support member includes an annular lip mounted in a flange assembly along a perimeter of the vessel at an upper end thereof, and a skirt depending from the lip secured to the tube sheet. A downward annular projection from the lip adjacent an outer diameter thereof can interlock with an upward annular projection from a lower flange of the flange assembly adjacent an inside diameter thereof. The downward projection has a greater inside diameter than an outside diameter of the upward projection. A first skirt refractory lining on an outer face of the skirt extends upwardly from adjacent the tube sheet toward the lip. A second skirt refractory lining is included on an inside face of the skirt extending downwardly from adjacent the lip toward the tube sheet. The first and second skirt refractory linings overlap longitudinally at least a portion of the skirt inner and outer faces. The flange assembly, as well as the lip mounted therein, is thus located in a relatively cool environment facilitated by the overlapping of the refractory over and behind the skirt.

The present invention also provides a catalytic reactor, wherein the tubes in the heat exchanger are adapted to hold catalyst therein and allow the passage of reactant fluid(s) therethrough. The reactor has particular utility in the catalytic reforming of hydrocarbons passed through the tubes in contact with the catalyst. A perforated lower end cap on respective ends of the tubes can support the catalyst thereon and allow fluid flow therethrough. The reactor can include an orifice plate horizontally positioned on top of the tube sheet. The orifice plate includes a plurality of orifices therein to evenly distribute fluid among the tubes. A plurality of perforated tube caps can be attached to an upper face of the orifice plate with the caps disposed over respective orifices. The orifice plate can be formed in a plurality of sections sized to fit through a first inlet in the upper end of the reactor. A distributor plate is preferably supported from the tube sheet and disposed adjacent the lower end of the tubes for distributing a heating fluid, usually effluent from a fired tubular reformer, over the tubes. A plurality of horizontal baffles can be spaced longitudinally in the tube bundle, and also supported from the tube sheet.

BRIEF DESCRIPTION OF THE DRAWINGS

FIG. 4 is an exploded sectional view of the flange assembly of the FIG. 1 reactor illustrating the contact between the upper and lower flange members.

FIG. 5 is a sectional view of the orifice plate, tube sheet and tube bundle relationship of the FIG. 1 reactor wherein the tubes depend from the tube sheet.

FIG. 8 is a plan view of the orifice plate of FIG. 5 illustrating the multi-sectioned construction thereof.

DETAILED DESCRIPTION OF THE INVENTION

Figure 1:
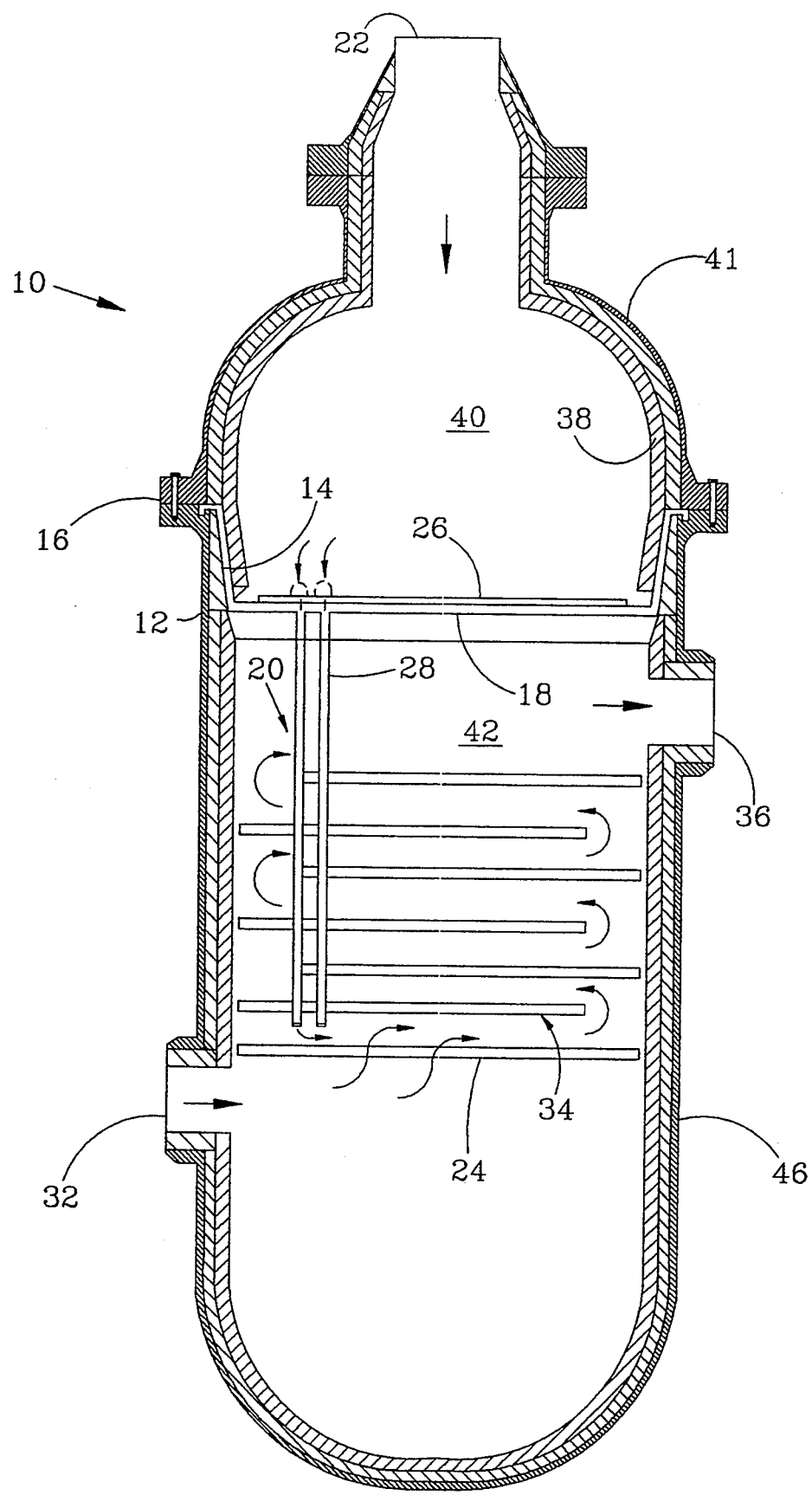
FIG. 1 is a partially cut away cross sectional view of a catalytic reactor according to the invention.

Reference will now be made in detail to the present invention as described in the accompanying drawings wherein like reference numerals are used to indicate like parts. In FIG. 1, a refractory-lined catalytic reactor 10 includes a vessel 12 including a tube sheet support member 14 depending from a flange assembly 16 to support a tube sheet 18 and a tube bundle 20 secured thereto. In operation, relatively cool reactant feed fluid, e.g. 480°–760° C., enters a first inlet 22. The reactant feed flows downward through an orifice plate 26, the tube sheet 18 and the tube bundle 20. The tube bundle 20 includes a plurality, typically several hundred up to a thousand or more, of catalyst-filled tubes 28 in which the reactants are catalytically reacted. The reacted fluid leaves the lower end of each tube 28. A heating fluid, preferably effluent from a reformer, e.g. a fired tubular reformer, is introduced in a second inlet 32, passed through perforations in a distributor plate 24 and evenly distributed to mix with the reacted fluid. The mixture of the reacted fluid and heating fluid flows laterally and upward through a network of baffles 34 which distribute the mixture across each tube 28 for heat transfer with the tubes 28. The fluid mixture is discharged through an outlet 36 for further processing in a conventional manner.

The reactor 10 generally comprises an upper, tube-side chamber 40 and a shell-side chamber 42 below. The tube-side chamber 40, is preferably enclosed by a head 41. The tube sheet 18 serves as a horizontal partition separating the tube-side chamber 40 from the shell-side chamber 42. The reactant feed enters the tube-side chamber 40, flows through the tube bundle 20 and mixes with the heating fluid in the shell-side chamber 42 using conventional techniques well known in the art. The vessel 12 includes a heat-resistant refractory lining 38 generally affixed to the interior surface of both the tube-side chamber 40 and shell-side chamber 42. The refractory lining is generally composed of ceramic or cement-like materials well known in the art, and can include one or more layers. The temperatures for which the vessel 12 is designed can vary between approximately 260°/−25° C. (500°/−10° F.) in the tube-side chamber 40, and between approximately 425°/−25° C. (800°/10° F.) in the shell-side chamber 42. The vessel 12 is designed to withstand internal pressures which can be as high as, for example, approximately 3.4–6.9 MPa (500–1000 psi). The vessel 12 can include a conventional water jacket (not shown) in heat exchange with an exterior wall 46, often used in such reforming reactors. The water jacket can be used to monitor for generation of greater-than-normal amounts of steam which may indicate a potential "hot spot" or refractory failure.

Figure 2:
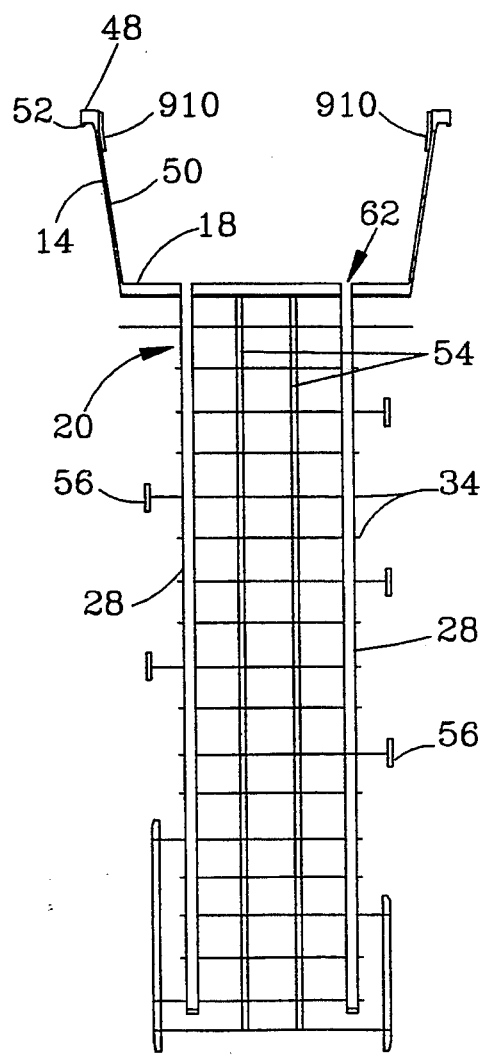
FIG. 2 is a sectional view of the tube sheet support member of the FIG. 1 reactor illustrating the relationship between the tube bundle, tie rods, baffles and the distributor plate.

FIG. 2 illustrates the tube sheet support member 14, the tube sheet 18, and the tube bundle 20. The tube sheet 18 can be constructed from various types of heat resistant steel plate known in the art. The tube sheet support member 14 includes a generally upright skirt 50, and a lip 48 spaced above the tube sheet 18, preferably adjacent an upper end of the skirt 50. The lip 48 includes a downward annular projection 52 for engagement with the flange assembly 16 (see FIGS. 1, 3 and 4). The skirt 50 is secured a distance below the lip 48, preferably adjacent a lower end of the skirt 50, to the tube sheet 18, preferably adjacent an outer periphery thereof.

The tube bundle 20 is, in turn, supported from the tube sheet 18. Each individual tube 28 is preferably strength welded and hydraulically expanded to the tube sheet 18. Although several hundred or even a thousand or more tubes 28 are not uncommon in reformers, only a few tubes have been illustrated in FIGS. 1–10 for the purposes of simplicity and clarity. The tube sheet 18 supports and positions the tube bundle 20, as well as baffles 34, the distributor plate 24 and a plurality of tie rods 54 which stabilize the baffles 34. The tie rods 54 depend from the tube sheet 18 and are secured to baffles 34. The baffles 34 are perforated to slideably receive the individual tubes 28. The baffles 34 typically include bumpers 56 to keep it from contacting and possibly damaging the refractory 38 (see FIG. 1) during insertion and removal of the tube bundle 20.

The orifice plate 26 (see FIGS. 1 and 5) is generally positioned horizontally on top of the tube sheet 18. The orifice plate 26 preferably comprises a plurality of sections small enough to fit through the first inlet 22 (see FIG. 1). Thus, the sections of the orifice plate 26 preferably have dimensions less than the first inlet 22. The first inlet 22 provides an opening large enough to allow worker access to assemble the orifice plate 26 or to perform other maintenance or repair in or from the tube-side chamber 40. A plurality of tube caps 60 (see FIG. 5) are affixed to the top surface of the orifice plate 26 to help keep any debris, e.g. refractory pieces from the ceiling of the reactor, from plugging the orifices 62.

Figure 3:
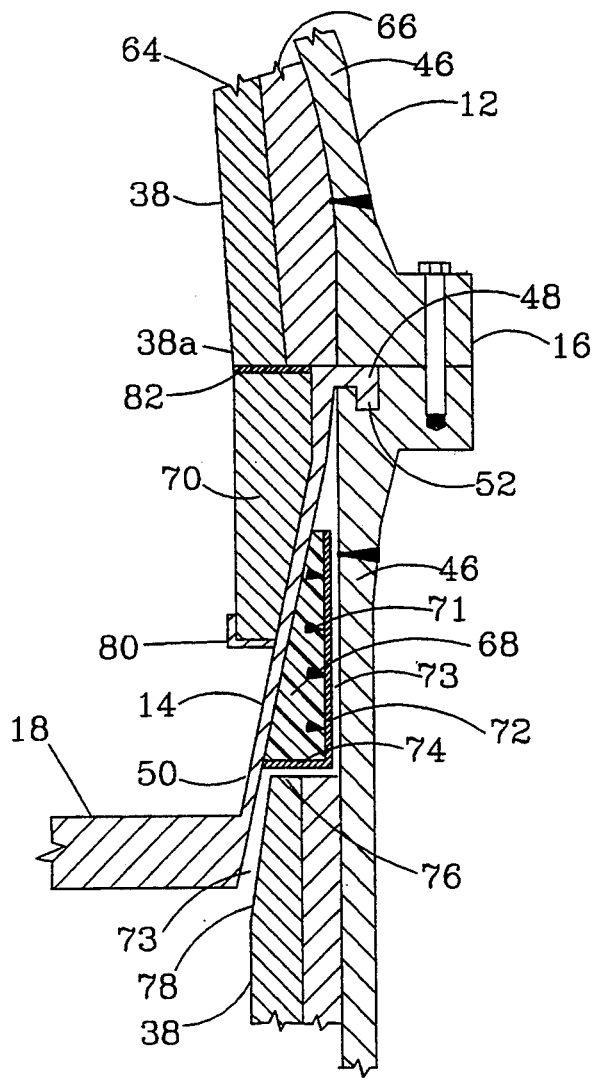
FIG. 3 is a sectional view of the flange assembly of the FIG. 1 reactor illustrating the refractory placement adjacent the support member and flange assembly.

FIG. 3 is a cross sectional view of the support member 14 in operative association with the flange assembly 16. The support member 14 includes the lip 48, the downward annular projection 52 and the skirt 50. The skirt 50 is affixed near its lower end to an outer edge of the tube sheet 18. By securing the lip 48 and downward annular projection 52 in the flange assembly 16, the skirt 50 and the tube sheet 18 are secured in place without stressing the refractory lining 38, thereby enhancing the durability of the lining 38. By avoiding contact between the refractory lining 38 and the tube bundle 20, the optimum life span of the refractory lining 38 may be achieved.

In one preferred embodiment, the vessel 12 is generally lined with a conventional two-layer insulating, i.e. a high density inner layer 64 exposed to the interior of the vessel 12 and the backup or reinforcing layer 66 positioned between the inner layer 64 and the wall 46 of the vessel 12. This refractory can be assembled using conventional refractory anchors, cold seams and mounting hardware generally used for this purpose in the art. In the vicinity of the flange assembly 16 and the tube sheet 18, however, first and second skirt refractories 68 and 70, respectively, are overlapped to thermally isolate or protect the lip 48 and flange assembly 16. The first skirt refractory 68 lines an outer face of the skirt 50 extending upwardly from adjacent the tube sheet 18 toward the lip 48 and flange assembly 16. The second skirt refractory 70 similarly extends downwardly from adjacent the lip 48 and flange assembly 16 toward the tube sheet 18 so that the skirt 50 is overlapped by the first skirt refractory 68 having an upper end above a lower end of the second skirt refractory 70.

The skirt 50 generally slopes inwardly from a maximum diameter adjacent the lip 48 to a minimum diameter adjacent the tube sheet 18. The first skirt refractory 68 is preferably positioned in the annular space between the skirt 50 and the opposing wall 46 of the vessel 12. For example, the refractory 68 preferably comprises refractory cast or otherwise disposed in a structural support member which is made of suitable steel plate (e.g. ¼-inch SA-240-TP347H) in the form of a generally cylindrical wall 72 extending the vertical length of the refractory 68 and a transverse connecting ring 74 between a lower end of the cylindrical wall 72 and the skirt 50. The connecting ring 74 can be secured to the skirt 50, for example, by welding. The refractory 68 can preferably be securely anchored in place by a plurality of conventional refractory anchors 71 installed on an inside face of the wall 72.

The wall 72 is desirably spaced from the opposing wall 46 of the vessel 12 a sufficient distance to provide an expansion gap 73 to allow thermal expansion to operating temperatures without inducing stress from abutment thereof. Similarly, the connecting ring 74 is spaced vertically from an upper end 76 of adjacent refractory 38 lining the vessel 12 below the tube sheet 18. Where the upper end 76 terminates above a lower face of the tube sheet 18 and/or the refractory 38 has an inside diameter less than the outside diameter of the tube sheet 18, the upper end 76 of the refractory 38 can also have a radially tapered surface 78 complementing the slope of the skirt 50, and radially spaced therefrom to allow for thermal expansion. A similar spacing of the refractory 68 from the skirt 50 can be effected by deploying a combustible spacing element, e.g. ⅛-inch cardboard (not shown) between the refractory 68 and the skirt 50. The cardboard burns away at the reactor operating temperature to form the appropriate spacing.

The second skirt refractory 70 is similarly supported from a support ring 80 generally made of the same material and similarly welded to an inside face of the skirt 50 as the transverse connecting ring 74 discussed above. If desired, a plurality of vertical slots (not shown) can be made in the support ring 80 to allow for thermal expansion without buckling. The refractory 70 is generally secured in place with a plurality of conventional refractory anchors (not shown) positioned on the inside face of the skirt 50 and the use of conventional cold seams (not shown).

The refractory 70 generally terminates at an upper end thereof in engagement with an end 38a of the refractory lining 38 adjacent the flange assembly 16. For convenience and simplicity, the refractory 70 terminates at an upper plane substantially even with the opposed flange faces in the flange assembly 16, and an annular ceramic gasket 82 can be used to effect a thermal seal between the adjacent refractories 38a and 70. The refractory 70 generally has an inside diameter at its upper end which is substantially equal with that of the adjacent refractory 38a, but an outside diameter of the refractory 70 matches the corresponding inside diameter of the lip 48 and skirt 50. The outside diameter of the refractory 70 here is generally less than that of the adjacent refractory end 38a, but preferably at least as great as the high density layer 64 so that the refractory 70 will have sufficient thickness to thermally shield the lip 48 and maintain the flange assembly 16 in a relatively cool environment. As the refractory 70 extends downwardly from the lip 48, it has a sloped outside diameter complementing an inside diameter of the skirt 50. The refractory 70 can have a cylindrical inside diameter or profile, or a decreasing diameter or inward slope going downwardly toward the tube sheet 18, e.g., complementing the slope of the skirt 50, to provide the refractory 70 with sufficient thickness for the desired degree of insulation.

As seen in FIG. 4, the flange assembly 16 preferably includes an upper flange 400, lower flange 402, and a primary gasket 404 which are secured together by a plurality of radially spaced bolts 406. The upper flange 400 has an annular sealing face 408 and an annular bolting shelf 410 in generally concentric relationship. The bolting shelf 410 is stepped axially upwardly with respect to the sealing face 408 and lies radially outwardly of the sealing face 408. The sealing face 408 has an inside diameter adjacent an inside diameter of the flange 400, and an outside diameter adjacent an inside diameter of the bolting shelf 410. The bolting shelf 410 has an outside diameter adjacent an outside diameter of the flange 400.

The lower flange 402 has an upward annular projection 412, an annular recess 414, an annular sealing face 416 and an annular bolting shelf 418, generally in concentric relationship. The projection 412 has an inside diameter adjacent an inside diameter of the lower flange 402, and an outside diameter adjacent an inside diameter of the recess 414. The recess 414 has an outside diameter adjacent an inside diameter of the sealing face 416, which has an outside diameter adjacent an inside diameter of the bolting shelf 418. The bolting shelf 418 has an outside diameter adjacent an outside diameter of the lower flange 402. The sealing face 416 is stepped up with respect to the recess 414, and in turn, the bolting shelf 418 is stepped up from the sealing face 416.

The bolts 406 are each slideably received in an upper bore 420, formed in the upper flange 400, and threadably engaged in a respective lower bore 422. The bores 420 and 422 are generally positioned transversely with respect to the opposed annular upper and lower bolting shelves 410 and 418. The upper bolting shelf 410 generally has an inside diameter slightly less than the inside diameter of the lower bolting shelf 418 to facilitate alignment of the upper and lower flanges 400 and 402, on the steps between the bolting shelves 410 and 418, and the sealing faces 408 and 416.

The gasket 404 is generally compressed between the upper and lower sealing faces 408 and 416. The gasket 404 is constructed of conventional gasket material (e.g. solid, soft annealed 4–6% chromium steel alloy) suitable for the intended service condition, including the rated temperature and pressure. The gasket 404 generally has an outside diameter adjacent the outside diameters of the upper and lower sealing faces 408 and 416, and an inside diameter adjacent the inside diameter of the lower sealing face 416. The compression of the gasket 404 between the opposed sealing surfaces 408 and 416, generally provides the primary seal between the flanges 400 and 402.

The lip 48 preferably includes a downward annular projection 52 and a generally concentric annular sealing recess 426. The downward projection 52 has an outside diameter adjacent, but slightly less than the inside diameter of the lower sealing face 416, and an inside diameter adjacent, but slightly greater than the outside diameter of the upward projection 412. The downward projection 52 is thus received in the recess 414. The sealing recess 426 has an outside diameter adjacent, but preferably slightly greater than the outside diameter of the upward projection 412, and an inside diameter adjacent, but preferably less than the inside diameter of the upward projection 412. The upward projection 412 is thus received in the sealing recess 426.

The interengagement, of the upward and downward projections 412 and 52 in the respective recesses 426 and 414, serves to interlock the lip 48 in the flange assembly 16. A sealing engagement between projection 412 and the recess 426 preferably effects a seal between the chambers 40 and 42 (see FIG. 1) and keeps hot fluid from circulating between the lip 48 and the flange assembly 16. For example, by providing an upper surface of the upward projection 412 with a ⅛-inch INCONEL 600 alloy weld overlay to a finish of 80 RMS, and the recess 426 with a ⅛-inch INCONEL 600 alloy weld overlay to a finish of 80 RMS, a suitable seal can be obtained. Other conventional sealing means, e.g. a gasket, could also be used for this purpose.

As best seen in FIG. 5, the combination of the tube cap 60, the orifice plate 26, the tube sheet 18, the tube bundle 20 and the orifices 62 facilitate passage of fluids from the tube-side chamber 40 to the tube bundle 20. The respective orifices 62 and tube caps 60 are preferably concentric. The tube caps 60 each contain a plurality of perforations 114 which are smaller in diameter than the respective underlying orifice 62 located on the orifice plate 26 beneath the tube cap 60. Each orifice 62 extends through the orifice plate 26 to a respective tube 28. The tube caps 60 help prevent any debris from plugging the orifices 62 and tubes 28. The orifices 62 facilitate a uniform distribution of fluid flow through the tubes 28. Also, the catalyst can be removed from the tubes 28 by removing the sections of the orifice plate 26 and using any suitable removal methods, such as vacuuming the catalyst from the tubes 28. With the orifice plate 26 and tube caps 60 removed, new or additional catalyst can also be added to the tube bundle 20.

Figure 6:
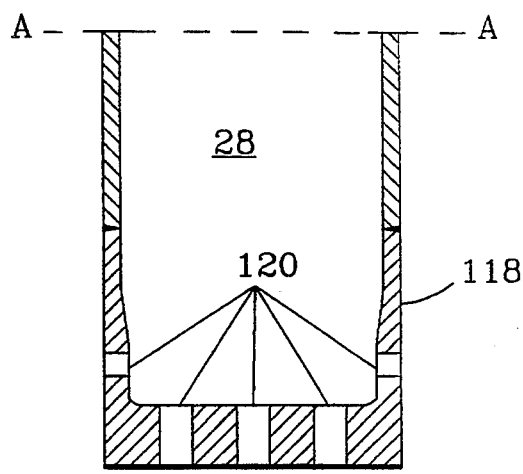
FIG. 6 is a sectional view of a lower end cap used to support catalyst in the tubes according to the invention.
Figure 7:
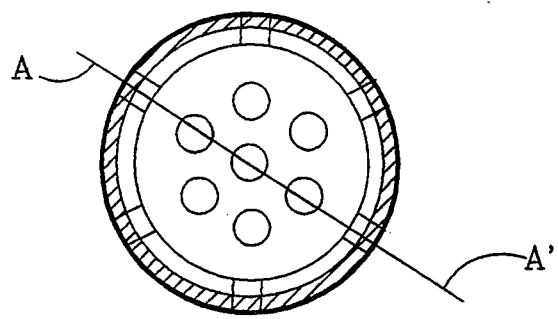
FIG. 7 is a plan view of the lower end cap of FIG. 6.

As seen in FIGS. 6 and 7, a preferred embodiment of an end cap 118 is illustrated having a plurality of perforations 120. Each tube 28 has affixed to its lower end, one end cap 118 to retain catalyst material in the tube 28. Reaction products from the catalyst-filled tubes 28 exit from the perforations 120 through the end cap 118. The perforations 120 are thus designed to be small enough to retain the catalyst within the tube 28, but large enough to allow the reaction products to flow therethrough with a desirably low pressure drop.

As seen in FIG. 8, the multi-sectional construction of the orifice plate 26 is provided by one or more seams 122 between adjacent sections of the orifice plate 26.

Figure 9:
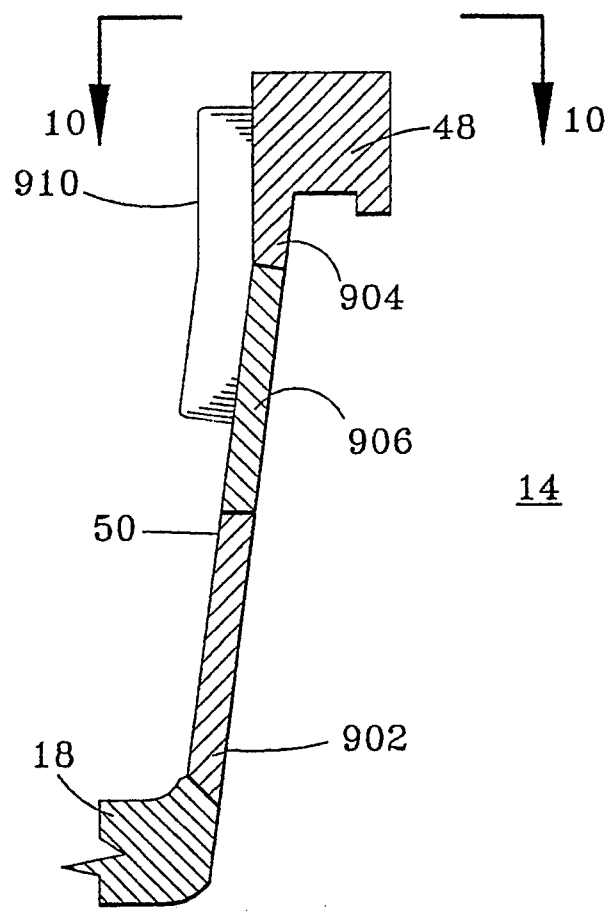
FIG. 9 is a side sectional view of the tube sheet and skirt used in the support structure of the reactor of FIG. 1.

With reference to a preferred embodiment shown in FIG. 9, the skirt 50 is preferably constructed of different materials to facilitate reducing thermal stresses which could develop in service. The tube sheet 18 is generally made of a high temperature alloy (e.g., 347 stainless steel) with a relatively high thermal expansion coefficient. A lower portion 902 of the skirt 50 which is exposed, i.e. below the support ring 80 (see FIG. 3), is preferably made of the same or a similar high temperature alloy welded directly to the tube sheet 18. The lip 48 and an upper portion 904 of the skirt 50 are preferably made of materials, which can be the same or different, suited for relatively cooler temperatures (e.g., 1¼% chromium-½% molybdenum steel alloy) generally having a relatively lower thermal expansion coefficient. An intermediate portion 906 of the skirt 50 welded between the portions 902 and 904 is desirably made from a material having an intermediate thermal expansion coefficient (e.g. INCONEL chromium-nickel alloy) to help relieve the thermal stresses which could otherwise develop if the skirt 50 was made from only one or two materials.

Figure 10:
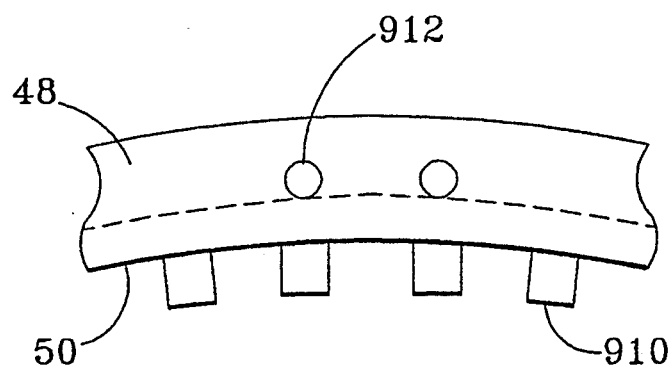
FIG. 10 is a plan view of the support structure of FIG. 9 as seen along the lines 10—10.

Also, with reference made to FIGS. 9 and 10, the skirt 50 can be reinforced by welding or otherwise attaching a plurality of longitudinal fins 910 to the skirt 50. The fins 910 are preferably secured to an inner face of the skirt 50, extending vertically to span the weld between the upper portion 904 and intermediate portion 906. The fins 910 are preferably made from a suitable high strength material, which can be the same as upper portion 904 or intermediate portion 906. The lip 48 can also be provided with a plurality of threaded bores 912 by which the entire assembly of the support structure 14, the tube sheet 28 and the tube bundle 20 (see FIG. 2) can be hoisted for pulling or replacement when this is necessary, for example, by threading eye bolts (not shown) into the bores 912 and passing a suitable cable from a crane, wench, hoist or the like through the eyes.

With the flange assembly 16 disengaged and the head 41 removed, the tube sheet support member 14, including the preassembled tube sheet 28, tube bundle 20, and skirt refractories 68, 70, can be hoisted above the vessel 12 and lowered in place so that the lip 48 engages with the lower flange 402 with the downward projection 52 received in the recess 414. Simultaneously, the upward projection 412 of lower flange 402 engages with the sealing recess 426 of the lip 48. Care is generally taken during the insertion of the tube sheet support member 14, tube sheet 18 and tub bundle 20 such that the refractory 38 is not damaged. Once the lip 48, tube sheet support member 14, tube sheet 18 and tube bundle 20 have been properly set in place within the vessel 12, the gasket 404 is placed on the sealing face 416, and the ceramic gasket 82 on the upper end of skirt refractory 70. With the gasket 404 in place, the head 41 is raised above the vessel 12, lowered in place so that the upper flange 400 engages the lower flange 402 and the bolt holes or bores 420, 422 are vertically aligned. The bolts 406 are received in the upper bore 420, threadably engaged in the respective lower bore 422 and tightened to the desired torque. Upon tightening the bolts 406, the gasket 404 forms a primary seal, a secondary seal is formed between the lip 48 and the flange assembly 16, and a thermal seal is formed between the adjacent refractories 38a and 70.

Once operating temperatures have been reached within the vessel 12, the tube-sheet support member 14 will expand, thus changing the dimensions of the expansion gap 73, and there may be a slight abatement between the cylindrical wall 72 and the exterior wall 46.

It will be appreciated that this or other high temperature heat exchangers within the purview of the present invention can be provided to support tube bundles, with or without catalyst filling, which do not impact the interior refractory and which more effectively support interior components. For example, a lower tube sheet could replace the distributor plate and an additional port could be placed between the tube sheets for operation of the vessel as a heat exchanger without reaction. The tube-side fluid would be withdrawn from a lower head defined below the lower tube sheet; the shell-side fluid would be introduced and withdrawn from the ports between the tube sheet.

Additional high temperature heat exchangers and reactors, and various modifications of the techniques, procedures, material and equipment, will be apparent to those in the art. It is intended that all such variations within the scope and spirit of the appended claims be embraced thereby.

We claim:

1. A high temperature heat exchanger for transferring heat between shell-side and tube-side fluids comprising
   a vessel, including a heat resistant refractory lining affixed to an interior surface of the vessel, having upper and lower ends;
   a flange assembly adjacent the upper end of the vessel;
   a tube bundle supported in the vessel between the upper and lower ends, said tube bundle including a plurality of tubes depending from a tube sheet secured to a tube sheet support member;
   the tube sheet support member comprising an annular lip mounted in the flange assembly and a skirt having upper and lower ends and wherein the skirt depends from and is secured to the lip at the upper end of said skirt and is secured to the tube sheet at the lower end of said skirt;
   a first skirt refractory lining on an outer face of the skirt adjacent the interior surface of the vessel and spaced apart from said interior surface and the refractory lining affixed to said interior surface, said first skirt refractory lining extending upwardly from adjacent the tube sheet toward the lip; and
   a second skirt refractory lining on an inside face of the skirt extending downwardly from adjacent the lip and the refractory lining affixed to the interior surface of the vessel toward the tube sheet, wherein said first and second skirt refractory linings overlap longitudinally at least a portion of the skirt inner and outer faces.

2. The exchanger of claim 1, further comprising:
   a downward annular projection from said lip adjacent an outer diameter of said lip interlocked with an upward annular projection from a lower flange of the flange assembly adjacent an inside diameter of said lower flange wherein the downward projection has a greater inside diameter than an outside diameter of said upward projection.

3. The exchanger of claim 1, wherein the flange connection includes a gasket disposed between an upper sealing face of an upper flange, and a lower sealing face of a lower flange, said lower sealing face having an inside diameter adjacent said lip and an outside diameter adjacent to an outside diameter of the upper sealing face.

4. The exchanger of claim 1, wherein the flange assembly includes an upward annular projection having a sealing surface to engage a sealing surface of the lip to form a seal between an upper tube-side chamber, on one side of the tube sheet and the skirt, and a shell-side chamber on the other side of the tube sheet and skirt.

5. The exchanger of claim 1, wherein the flange assembly includes an annular recess to engage a downward annular projection of the lip.

6. The exchanger of claim 1, wherein the flange assembly includes a primary gasket disposed between opposed primary sealing faces on upper and lower flanges, and a plurality of radially spaced bolts urging the upper and lower flanges together to compress the gasket to form a primary seal between the gasket and the sealing faces.

7. The exchanger of claim 1, further comprising an annular ceramic gasket disposed between an upper end of the second skirt refractory lining and a lower end of a high density refractory lining of the vessel adjacent the second skirt refractory lining to form a thermal seal between the respective refractories.

8. The heat exchanger of claim 1, comprising:
   an upper flange in the flange assembly having a concentric annular upper-flange sealing face and an upper flange bolting shelf, the sealing face having an inside diameter adjacent an inside diameter of the upper flange and an outside diameter adjacent an inside diameter of the bolting shelf, the bolting shelf having an outside diameter adjacent an outside diameter of the upper flange;
   a lower flange in the flange assembly having a concentric annular upward projection, an annular recess, a lower-flange sealing face, and a lower-flange bolting shelf, the upward projection having an inside diameter adjacent an inside diameter of the lower flange and an outside diameter adjacent an inside diameter of the annular recess, the sealing face having an inside diameter adjacent an outside diameter of the annular recess and an outside diameter adjacent an inside diameter of the bolting shelf, and the bolting shelf having an outside diameter adjacent an outside diameter of the lower flange;
   a downward annular projection from the lip having an outside diameter adjacent the inside diameter of the lower-flange sealing face and an inside diameter adjacent the upward annular projection to interlock the downward annular projection in the annular recess;
   a lip sealing recess having an outside diameter adjacent the inside diameter of the downward projection and an inside diameter adjacent an inside diameter adjacent the upward projection to form a seal between the lip sealing recess and the upper annular projection of the lower flange;
   a gasket compressed between the upper flange and lower flange sealing surfaces to form a primary seal therewith;
   a plurality of radially spaced bolts disposed through bores opening to the upper flange bolting shelf and threadably engaged in bores opening to the lower flange bolting shelf;
   a step up from the lower flange sealing face to the lower flange bolting shelf matching a step up from the upper flange sealing face to the upper flange bolting shelf, wherein the lower flange step has a slightly larger diameter than the upper flange step to facilitate concentric alignment of the upper and lower flanges.

9. The exchanger of claim 1, wherein the skirt comprises a plurality of sections including an upper section adjacent the lip having a lower thermal expansion coefficient than a lower section adjacent the tube sheet, and the lower section adjacent the tube sheet having a higher thermal expansion coefficient than the upper section adjacent the lip, and an intermediate section disposed between the upper and lower sections having a thermal expansion coefficient less than that of the lower section and higher than that of the upper section.

10. The exchanger of claim 1, wherein the first refractory lining is supported adjacent the outer surface of the skirt by a retaining wall spaced radially from the skirt and connected thereto by a transverse ring affixed to the skirt and extending radially outwardly to a lower end of the retaining wall.

11. The exchanger of claim 1, wherein the second refractory lining is supported adjacent the inner surface of the skirt on a support ring affixed to the skirt.

12. The exchanger of claim 1, further comprising an expansion gap between an opposing wall of the vessel and the first skirt refractory lining at ambient temperatures to facilitate thermal expansion of the skirt to operating temperatures.

13. The exchanger of claim 1, wherein an internal refractory layer affixed to the inner surface of the vessel adjacent the lower portion of the skirt has a radially tapered surface complementing a slope of the skirt, and the skirt is radially spaced from said layer at ambient temperatures to allow for thermal expansion to operating temperatures.

14. The exchanger of claim 1, further comprising an orifice plate positioned over the tube sheet, said orifice plate having a plurality of orifices for tube-side fluid communication.

15. The exchanger of claim 14, further comprising:
a plurality of perforated caps, each attached to an upper face of the orifice plate over a respective orifice.

16. The exchanger of claim 15, wherein the tubes are adapted to hold catalyst for reaction of fluid within the tubes.

17. The exchanger of claim 16, wherein each tube has a perforated lower end cap to support the catalyst and allow fluid flow therethrough.

18. The exchanger of claim 1, wherein the vessel contains a distributor plate supported from said tube sheet and disposed adjacent the lower end of the vessel for distributing a heating fluid over the tubes.

19. The exchanger of claim 1, wherein a plurality of horizontal baffles are spaced longitudinally in the tube bundle supported from said tube sheet.

20. A method for supporting a tube bundle in a high temperature, refractory-lined heat exchanger, comprising:
securing upper ends of a plurality of tubes in a tube sheet;
attaching a skirt to the tube sheet, wherein the skirt has an annular lip spaced from the tube sheet;
lining the skirt with a first skirt refractory lining on an inside face of the skirt from adjacent the lip to a first refractory support ring spaced above the tube sheet;
lining the skirt with a second skirt refractory lining on an outside face of the skirt from a second refractory support ring spaced below the first support ring to above the first support ring to overlap the skirt with the first and second refractory linings;
lowering the tube bundle into a refractory vessel and engaging a downward annular projection from the lip into a corresponding annular recess formed in a first flange face at an upper end of the vessel, to interlock the lip in the lower flange and suspend the skirt, tube sheet and the bundle therefrom;
placing a top head on the vessel including a second flange matching with the first flange to form a primary seal between the flanges and a secondary seal between the lip and the flanges.

* * * * *